Feb. 23, 1932. J. H. JOHNSTON 1,846,259
SAFETY BACKSTOP FOR MOTOR DRIVEN VEHICLES
Filed Sept. 12, 1929    2 Sheets-Sheet 1

Inventor;
Joshua H Johnston

Feb. 23, 1932.  J. H. JOHNSTON  1,846,259
SAFETY BACKSTOP FOR MOTOR DRIVEN VEHICLES
Filed Sept. 12, 1929   2 Sheets-Sheet 2

Inventor;
Joshua H. Johnston,
By Chas. Silver
Attorney.

Patented Feb. 23, 1932

1,846,259

UNITED STATES PATENT OFFICE

JOSHUA H. JOHNSTON, OF BALTIMORE, MARYLAND

SAFETY BACKSTOP FOR MOTOR DRIVEN VEHICLES

Application filed September 12, 1929. Serial No. 392,105.

This invention relates to attachments for motor-driven vehicles, more specifically automobiles, and for similar power-driven mechanisms.

Among the objects of this invention is to provide a means for preventing and arresting backward-drifting of an automobile when brought to a stop. A further object of this invention is to provide a means for preventing the clutch shaft of an automobile from turning backwards if the engine backfires when being started.

A still further object of this invention is to provide a mechanism which will accomplish the above-named objects in an efficient manner and without necessitating the performance of additional duties by the operator of the vehicle, said mechanism operating in a substantially noiseless manner and being adapted for ready attachment to the commonly used constructions in automobiles and other power mechanisms without material changes in their present construction.

Other, further and more specific objects of this invention will become readily apparent to persons skilled in the art from a consideration of the following description when taken in conjunction with the accompanying drawings wherein.

Figure 1:
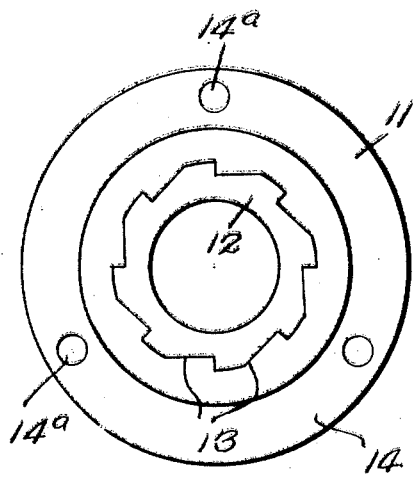
Fig. 1 is a detail end view of the ratchet plate of my device.
Figure 2:
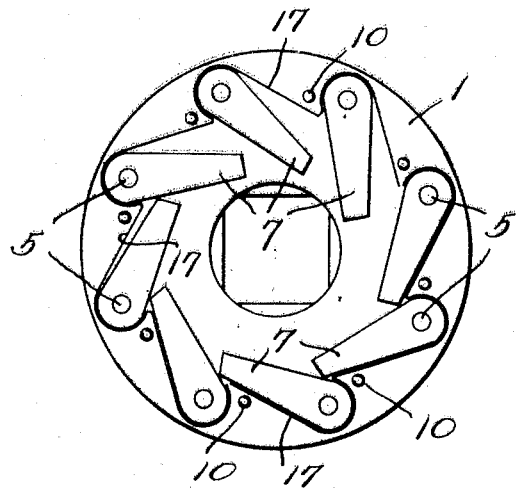
Fig. 2 is an end view of the housing member of my device showing the distribution of the pawls or locking members.
Figure 3:
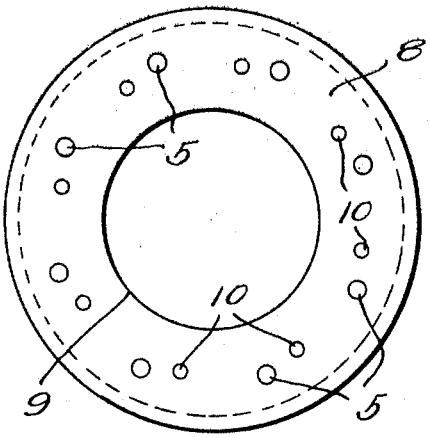
Fig. 3 is a front end view of the closure plate for the housing.
Figure 4:
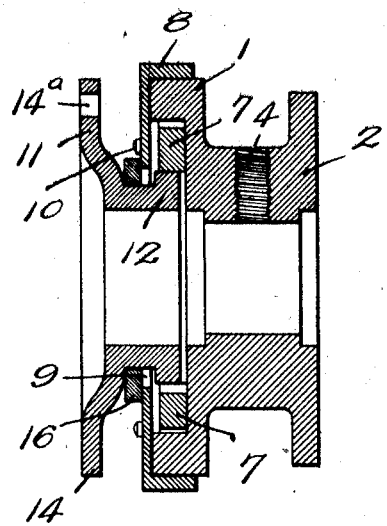
Fig. 4 is a cross-sectional view of the ratchet plate, housing and closure plate in assembled position.

The housing 1 is centrally bored and provided with the hub 2 which may be fastened to the clutch shaft 3 and secured thereto by a key or the screw 4. A series of shafts 5 are disposed within the cavity 6 of the housing and are fastened to the housing near its periphery, the axis of said shafts being on a circle substantially concentric with the housing 1. These shafts 5 support the pawls or locking members 7. A cover plate 8 having a central opening 9 is secured to the housing 1 by means of the fasteners 10. The ratchet plate 11 is also centrally bored and its central projection or hub 12 is adapted to fit over the clutch shaft 3. This hub 12 carries the ratchets 13 which extend into the housing 1.

In using my new device upon an automobile, the bases 14 of the ratchet plate 11 is positioned upon the clutch shaft 3 and bolted at 14a or otherwise secured to the transmission box 15. The housing 1 with the cover plate 8 fastened thereto is then moved upon the shaft 3 until the ratchets 13 are in line with the pawls 7, and the housing 1 is then fixed into position by the screw 4. The ratchet plate 11 fits over the clutch shaft with sufficient clearance to allow a small amount of oil from the transmission box to enter the housing 1 and lubricate the interior thereof, thus aiding the pawls to operate easily and noiselessly. In order to provide an oil-tight construction I employ the felt washer 16 between the cover plate 8 and the ratchet plate 11.

Figure 5:
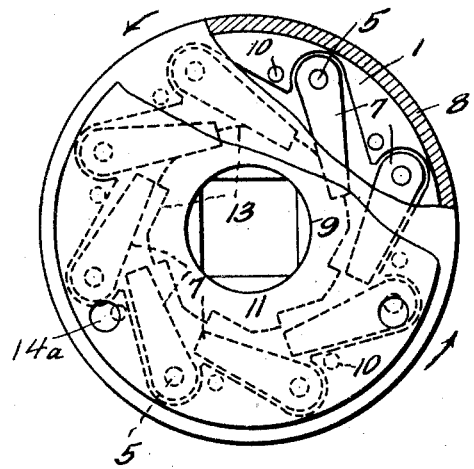
Fig. 5 is a side view of the device shown in Fig. 4, part of the device being broken away to show the interior construction and relationship of parts of the device.
Figure 6:
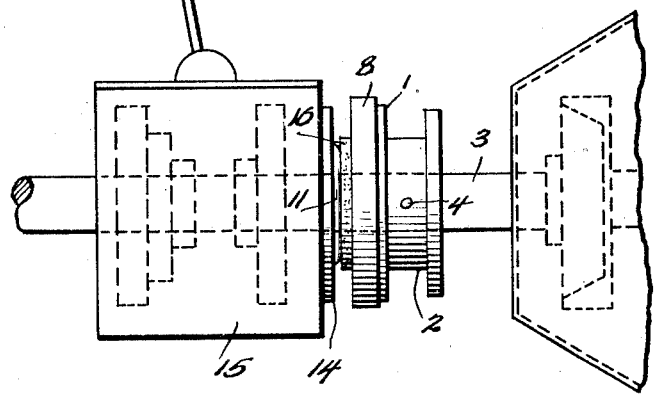
Fig. 6 is a side elevation showing the device illustrated in Fig. 4 applied to the clutch shaft of an automobile mechanism.

With my new device in this position, and the clutch "in", the housing 1 will rotate in the direction of the arrows (Fig. 5) with the clutch shaft as the engine rotates, the ratchet plate 11 remaining stationary. Normally, when the housing is at rest or moving very slowly, some of the pawls at the top of the housing and in the topmost zone of their path of revolution are in engagement with the ratchets 13, and as the housing revolves, a very objectionable and annoying clicking action or noise results when these moving pawls trip over the stationary ratchets. As the speed of the housing increases, the centrifugal force exerted upon the pawls 7 by this movement of the housing 1 will cause all of the pawls to swing upon their shafts and become seated against the stops 17 and away from contact with the ratchets 13. As none of the pawls are then in contact with the ratchets, the objectionable noise and clicking is eliminated. With the clutch "in", should there be any tendency for the engine to reverse, such as caused by backfiring, the housing being at rest and some of the pawls in engagement with the ratchets, my device will prevent reverse motion of the clutch shaft and also the engine. By this means, accidents such as injury to the limbs when "cranking" an automobile are avoided.

With the mechanism now employed on automobiles, when the automobile is headed upgrade and as it is started from a position of rest, the automobile drifts backward while the transmission is brought through its clutch connection into communication with the power or engine mechanism. This backward drifting exposes the automobile and its occupants to objectionable hazards. With my new device in operation, the clutch shaft being in engagement with the transmission mechanism, downward drifting of the automobile will be prevented by the pawl and ratchet mechanism, because the housing 1 can revolve in only one direction and this direction always corresponds to the positive movement and rotation of the transmission mechanism. This transmission mechanism revolves in the same direction whether it is connected to the gearing driving the automobile forward or backward. Consequently, if the automobile is headed downhill and the gears are thrown in reverse in order to back the car uphill, my mechanism will prevent the automobile from drifting forward. Therefore, regardless of the direction in which it is desired to move the automobile, my new device automatically prevents drifting in the opposite direction so that when the clutch is being thrown in, the automobile will behave just as if it were resting upon level ground instead of on a grade.

It will be seen that by having a single ratchet 13 on the ratchet plate 11, the device will operate when the rotating member is provided with a few or even with a single pawl. However, by providing several pawls at the top of the ratchet plate and also providing a plurality of closely spaced pawls, not only is the pressure distributed over several pawls and ratchets but the arresting of reverse movement will take place smoothly and quickly, without any lapse of time for the pawl to reach the ratchet.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:
1. Means for preventing reverse rotation of a power-driven shaft, said means comprising a rotatable member having at one end a hub bored to fit closely on the shaft, means for fastening the rotatable member upon the shaft and a housing at the other end of the rotatable member, a freely swinging pawl supported in said housing, a stationary member having a hub bored to fit loosely upon the shaft and extending into said housing, a ratchet upon the portion of the hub of the stationary member within the housing, said ratchet being in alignment with said pawl and said pawl being mounted to swing toward the periphery of the rotatable member and beyond the zone of contact with the ratchet by the centrifugal force exerted upon said pawl when said rotatable member is revolved and to swing toward and engage the ratchet when the rotatable member is at or near rest and the pawl is in the topmost zone of its path of revolution, and an oil-tight closure on the hub of the stationary member and bearing against the housing.

2. Means for preventing backward drifting of an automobile, said means being disposed upon the clutch shaft and between the automobile clutch and the transmission mechanism and comprising a rotatable member having at one end a hub bored to fit closely on the clutch shaft, means for fastening the rotatable member upon the clutch shaft and a housing at the other end of the rotatable member, a freely swinging pawl supported in said housing, a stationary member having a hub bored to fit loosely upon the clutch shaft and extending into said housing, ratchets upon the portion of the hub of the stationary member within the housing, said ratchets being in alignment with said pawl and said pawl being mounted to swing toward the periphery of the rotatable member and beyond the zone of contact with the ratchets by the centrifugal force exerted upon said pawl when said rotatable member is revolved and to swing toward and engage a ratchet when the rotatable member is at or near rest and the pawl is in the topmost zone of its path of revolution, and an oil-tight closure on the hub of the stationary member and bearing against the housing.

3. Means for preventing backward drifting of an automobile, said means being disposed upon the clutch shaft and between the automobile clutch and the transmission mechanism and comprising a rotatable member having at one end a hub bored to fit closely on the clutch shaft, means for fastening the rotatable member upon the clutch shaft and a housing at the other end of the rotatable member, freely swinging pawls supported in said housing and substantially equidistant from the axis of the clutch shaft, a stationary member having a hub bored to fit loosely upon the clutch shaft and extending into said housing, a ratchet upon the portion of the hub of the stationary member within the housing, said ratchet being in alignment with said pawls and each of said pawls being mounted to swing toward the periphery of the rotatable member and beyond the zone of contact with the ratchet by the centrifugal force exerted upon said pawls when said rotatable member is revolved and to swing toward and engage the ratchet when the rotatable member is at or near rest and the pawl is in the topmost zone of its path of revolution, and an oil-tight closure on the hub of the stationary member and bearing against the housing.

4. Means for preventing backward drifting of an automobile, said means being disposed upon the clutch shaft and between the automobile clutch and the transmission mechanism and comprising a rotatable member having at one end a hub bored to fit closely on the clutch shaft, means for fastening the rotatable member upon the clutch shaft and a housing at the other end of the rotatable member, freely swinging pawls supported in said housing, a stationary member having a hub bored to fit loosely upon the clutch shaft and extending into said housing, ratchets upon the portion of the hub of the stationary member within the housing, said ratchets being in alignment with said pawls and each of said pawls being mounted to swing toward the periphery of the rotatable member and beyond the zone of contact with the ratchets by the centrifugal force exerted upon said pawls when said rotatable member is revolved and to swing toward and engage a ratchet when the rotatable member is at or near rest and the pawl is in the topmost zone of its path of revolution, and an oil-tight closure on the hub of the stationary member and bearing against the housing.

In testimony whereof I have hereunto set my hand.

JOSHUA H. JOHNSTON.